United States Patent [19]

Mayo, Jr. et al.

[11] Patent Number: 4,648,244
[45] Date of Patent: Mar. 10, 1987

[54] INCLINED REACTION TURBINE WITH VORTEX SUPPRESSION

[75] Inventors: Howard A. Mayo, Jr., York; Warren G. Whippen, Dover, both of Pa.

[73] Assignee: Voith Hydro, Inc., York, Pa.

[21] Appl. No.: 676,419

[22] Filed: Nov. 29, 1984

[51] Int. Cl.$^4$ .............................................. F16D 31/02
[52] U.S. Cl. ....................................... 60/398; 290/52
[58] Field of Search ................. 60/398; 415/183, 500, 415/DIG. 1; 290/52; 405/75, 77

[56] References Cited

U.S. PATENT DOCUMENTS

| | | | |
|---|---|---|---|
| 1,730,578 | 10/1929 | Lawaczeck | 405/75 |
| 2,662,726 | 12/1953 | Thomas | 415/500 |
| 3,118,594 | 1/1964 | Helmbold | 415/DIG. 1 |
| 3,582,667 | 6/1971 | Mayo, Jr. | 290/52 |
| 4,226,573 | 10/1980 | Reid | 60/398 |

FOREIGN PATENT DOCUMENTS

| | | | |
|---|---|---|---|
| 1816014 | 6/1970 | Fed. Rep. of Germany | 415/183 |
| 747645 | 3/1934 | France | 290/52 |

OTHER PUBLICATIONS

An advertisement from: *Hydro-Review*, vol. 1, No. 4, Winter 1982, (Leroy-Somer, Inc.).
Allis-Chalmer Brochure, Standardizing Hydroelectric Generating Units, 8/31/84, p. 6.
Rindels et al., "An Experimental Study of Critical Submergences to Avoid Free-Surface Vortices at Vertical Intakes", 6/83, pp. 1–77.

*Primary Examiner*—Edward K. Look

[57] ABSTRACT

An open flume installation for a hydraulic turbine is disclosed having an open flume defined by a floor, a pair of side walls and a back wall of a foundation structure. A water passageway is formed through the foundation with an outlet submerged within the tailwater and with an inlet formed through the floor of the flume adjacent the back wall. The inlet is provided with its axis inclined at a 45° angle. A turbine runner is provided within the inlet for rotation about the axis. A generator is supported above the flume on a support structure spanning the side walls. An inclined shaft connects the runner and generator. The shaft and runner are supported for rotation by a conical vaned intake having its narrow portion surrounding the inlet and having its face portion extending between the side walls. A plurality of stay vanes project radially inwardly from the inner surface of the conical intake to a bearing housing which supports the shaft. The water passageway on the downstream side of the runner is a draft tube having a conical section on a downstream side of the runner connected to an elbow section which has a downstream end having a horizontal axis. A vortex suppressor is provided disposed within an upstream portion of the flume. The vortex suppressor comprises a plurality of plate members spaced parallel to one another and to the side walls of the flume. The plate members extend into a level of water within the flume and encourage laminar flow of water through the flume to the turbine intake.

2 Claims, 3 Drawing Figures

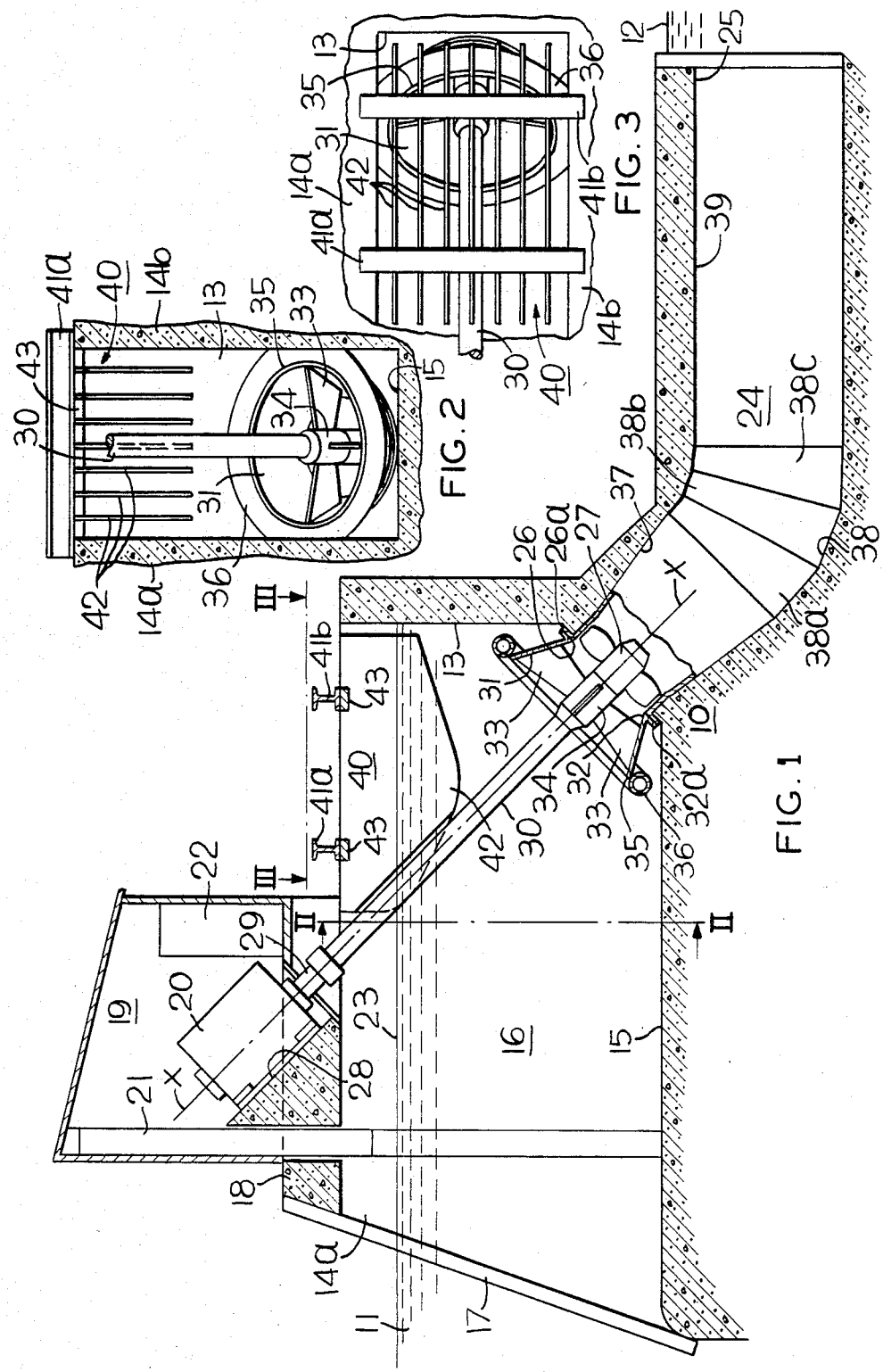

INCLINED REACTION TURBINE WITH VORTEX SUPPRESSION

BACKGROUND OF THE INVENTION

1. Field of the Invention

This invention relates to hydraulic turbines and, more particularly, to low head open flume hydraulic turbine installations. Additionally, this application relates to open flume hydraulic turbine installations having provisions for vortex suppression.

2. Description of the Prior Art

Intakes for hydraulic turbine installations come in a variety of designs For example, the list of prior art intakes includes penstocks, siphon intakes, open flumes and closed flumes. Each of these prior art methods for providing an intake for a hydraulic turbine installation differ from each other and include various design constraints.

The present invention relates to an open flume installation for a low head hydraulic turbine. An open flume installation typically comprises a flume defined by a back wall, a floor and a pair of laterally spaced vertical side walls. The side walls, floor and back wall define an open flume in communication with an upper elevation water source (such as a river or reservoir). Open flume installations are distinguishable from closed flume installations since the closed flume installation has a higher head loss due to a high velocity of water flow which results in higher friction against the ceiling of the closed flume. The higher velocity through a closed flume relocates vortex formation problems to the intake to the closed flume.

Open flume installations are old in the art and include vertical axis and horizontal axis turbine installation. In vertical axis open flume installations, a water passageway was formed in the installation support structure with an intake provided at the floor of the flume and an outlet provided submerged within a low elevation chamber or tailwater. A turbine runner was provided within the intake for rotation about a vertical axis. A vertical shaft projected from the runner upwardly to a generator. An example of such a vertical axis open flume installation is shown in the enclosed Allis-Chalmers Bulletin No. 54B10241-03 on page 7. A horizontal axis turbine in an open flume installation would conventionally have a similar flume width.

As is known in the art, open flume installations with either horizontal or vertical axis turbines are subject to certain dimension restrictions. For example, in a vertical axis turbine open flume installation, the width of the flume (the distance between the side walls) is three times the diameter of the turbine runner. Likewise, the depth of the elbow-shaped draft tube is about 2.7 times the diameter of the runner. Also, the center line of the runner axis is displaced from the back wall a distance of approximately 1.4 times the runner diameter. In horizontal axis open flume installations, similar dimension restrictions apply. These and other restrictions are enumerated in the above referenced bulletin.

The above referenced dimension restrictions found in vertical axis and horizontal axis open flume turbine installations are due to the flow pattern of water within the flume approaching the turbine intake. The dimension restrictions are necessary to prevent formation of vortices at the turbine intake. When a vortex occurs, air is included within the water flowing through the turbine which decreases the efficiency of the turbine and can cause unstable operation. Vortex formation is abated by following the above described dimension restrictions. Likewise, vortex formation can be abated by increasing the depth of the turbine intake. When vortex formation does occur at turbine installations, attempts are made to break up the vortex by floating logs or rafts in the area of vortex formation.

While the above referenced dimension restrictions may aid in abating vortex formation, they may result in construction costs for a particular hydraulic installation being so high as to make the installation uneconomical. In addition, for a given size open flume, the size of the hydraulic turbine is limited by the above installation restrictions. Conversely, for a given size turbine runner design, adequate excavation and civil engineering work must be incurred to provide a sufficiently large flume to account for the above described typical minimum dimension restrictions. Likewise, in the case of the vertical axis turbine, significant excavation is required to form the draft tube.

OBJECTS AND SUMMARY OF THE INVENTION

It is an object of the present invention to provide an open flume hydraulic installation with an increased turbine capacity for a given flume size.

It is a further object of the present invention to provide an open flume hydraulic installation with an increased size turbine while abating vortex formation in water approaching the turbine runner.

It is yet a further object of the present invention to provide an open flume turbine installation with a vortex suppressor for breaking up vortex formation within the flume.

According to a preferred embodiment of the present invention, there is provided an open flume installation with a foundation structure having a back wall, a pair of laterally spaced vertical side walls and a floor defining an open flume for containing a level of water. A water passageway is formed within the structure having an inlet in communication with the flume and an outlet submerged within a tailwater. The inlet is formed through the floor adjacent to the back wall and the inlet is generally cylindrical with an inclined axis projecting upwardly from the floor.

A turbine runner is supported within the inlet with a shaft extending from the runner on an inclined angle to a generator supported above the flume. A vortex suppressor is provided for breaking up any vortex formation within the flume.

BRIEF DESCRIPTION OF THE DRAWINGS

FIG. 1 is a view in elevation of an open flume hydraulic turbine installation according to the present invention;

FIG. 2 is a view taken along line II—II of FIG. 1; and

FIG. 3 is a view taken along line III—III of FIG. 1.

DESCRIPTION OF THE PREFERRED EMBODIMENT

Referring to FIG. 1, an open flume hydraulic turbine installation is shown having a foundation 10 separating an upper elevation water source (or headwater 11) from a low elevation tailwater 12. The foundation includes a back wall 13 and a floor 15. A pair of laterally spaced vertical side walls 14a and 14b (more fully shown in FIGS. 2 and 3) extend from the back wall 13 and project toward the headwater in an upstream direction.

The foundation floor 15, back wall 13 and side walls 14a and 14b cooperate to define an open flume 16 in communication with the headwater 11. A trash rack 17 extending between the side walls 14a and 14b in the floor 15 prevents the flow of debris and other trash from the headwater 11 into the flume 16.

A support structure 18 is provided spanning an upstream portion of the side walls 14a and 14b. The support structure supports a powerhouse 19 which houses the generator 20 and a vertical slide gate 21. Additionally, control cabinets such as electrical controls 22 may be housed within the powerhouse 19. Slide gate 21 is slideable between a down position with the gate extending between the side walls 14a and 14b and engaging the floor 15. In the down position, the slide gate 21 blocks flow of water from the headwater 11 into the flume 16. When the gate 21 is lifted to an up position (as shown in FIG. 1) water from the headwater 11 flows into the flume 16 and assumes a level of water 23 within the flume the same as the height of the headwater 11. The side walls 14a and 14b are sized with a vertical height such that the support structure 18 and gate 21 are clear of the water level 23 within the flume 16.

A water passageway 24 is formed through the foundation structure 10 with the water passageway 24 connecting the flume 16 in water flow communication with the tailwater 12. The passageway 24 may be lined with steel plate and has an outlet 25 submerged within the tailwater and an inlet 26 formed through the floor 15 at the intersection of the floor 15 and the back wall 13. The inlet 26 is generally cylindrical and has a cylindrical axis X—X substantially inclined and projecting upwardly from the floor and away from the back wall. Preferably, the axis has a 45° angle with the horizontal.

A turbine runner 27 is supported within the inlet 26 for rotation about an axis of rotation generally coaxial with the inlet cylindrical axis X—X. The support structure 18 is provided with an inclined surface 28 generally parallel to the axis X—X. The generator 20 is mounted on the inclined surface 28 with the axis of the generator shaft 29 coaxial with the axis X—X. The generator shaft 29 and the runner 27 are operably connected by means of a rotary shaft 30.

To support the shaft 30 and runner 27 and to provide a controlled flow of water to the runner 27, a tilted inverted conical vaned intake 31 is provided having a narrow end 32 surrounding the cylindrical inlet 26. A flange 32a on the narrow end 32 is attached to a flange 26a projecting from the steel plate at inlet 26. A plurality of fixed stay vanes 33 are secured to an inner surface of the conical intake 31 and project radially inwardly to the shaft 30. The vanes 32 terminate at and are secured to a bearing housing 34 which support the shaft 30 and runner 27.

As shown in FIGS. 2 and 3, an external base portion 35 of the conical intake 31 extends nearly completely between the side walls 14a and 14b. A radially outwardly projecting toroidal or donut-shaped collar 36 is secured to the base 35 of the conical intake 31. As shown in FIG. 1, the collar 36 comprises a tube secured to the outer edge of the base 35. The collar 36 operates to prevent turbulent flow of water at the base 35 of the intake 31. Flow of water from the areas between the outer surface of the intake 31 and the floor 15 or back wall 13 is guided by collar 36 in a smooth flow path toward intake 31 and thereby prevented from developing turbulence within water flow into the intake 31.

The water passageway 24 downstream of the inlet portion 26 comprises the draft tube for the turbine. As shown in FIG. 1, the draft tube comprises a conical portion 37 having a narrow end adjacent the downstream end of the inlet 26 and with an axis generally coaxial with axis X—X. An elbow portion 38 is provided having a generally constant cross-sectional area and having its upstream end adjacent the base of the conical portion 37 and having a downstream end with a generally horizontal axis. An expansion portion 39 is provided having a circular upstream end connected to the downstream end of the elbow portion 38 and shaped to present a rectangular discharge 25 into the tailwater 12.

A vortex suppressor 40 is provided on a downstream portion of the flume 16 to break up whirlpool or vortex formation within the flume 16. The vortex suppressor 40 comprises a pair of parallel support beams 41a and 41b which span the side walls 14a and 14b. Secured to the bottom of the support beams 41a and 41b are a plurality of plate members 42 which are formed from flat steel plates and secured by welding to the bottom of the support beams 41a and 41b. The plate members 42 are parallel to one another and to the axis X—X. The plate members 42 are maintained in fixed spaced relation by a plurality of spacer bars 43 secured to the bottom of the support beams and extending between the plate members 42. The plate members 42 may be either rectangular or contoured, as shown in FIG. 1, to extend into the level of water in an area of the flume susceptible to vortex formation. Appropriate plates may be cut away to prevent interference with the shaft 30.

In operation of the turbine installation, the turbine intake 31 is located at the floor of the open flume and as near as practical to the downstream back wall. This arrangement provides for a maximum submergence of the turbine intake 31. Additionally, the inclination of the intake accounts for the natural flow pattern of water approaching the intake 31 and thereby abates vortex formation problems. By abating vortex formation problems, the walls 14a and 14b can be provided approximately abutting the base portion 35 of the intake 31. Accordingly, for any given size flume 16, a larger runner 27 (and hence more capacity) can be provided within the flume. For a turbine to be installed within an existing flume, the present invention permits a larger turbine than provided by the prior art and, accordingly, a more economical utilization of the hydraulic site. For a new installation for a predetermined size turbine, the present invention requires a smaller flume than would have been required by the prior art, and hence, a significant reduction in construction costs. In either case, the inclined shaft permits the generator 20 to be positioned near the slide gate 21. This reduces construction cost compared to prior art installations, since the powerhouse 19 size can be compacted with all powerhouse requirements located on the upstream side of the flume.

The inclined turbine together with the elbow portion 38 of the draft tube following a conical portion 37, results in the deepest portion of the draft tube being on a downstream side of the back wall 13 which greatly facilitates excavation and construction. This is particularly important for existing structures where excavation under existing walls or floors is very expensive. By providing the conical portion 37 at an inclined angle, the elbow portion can be provided at less than 90° which makes for an elbow portion which is easily fabricated from wedge-shaped cylindrical sections 38a, 38b and 38c and the reduced angle has less loss.

While the inclination of the turbine and the positioning of the intake at the back wall help to abate vortex formation, the problems of vortex formation are further reduced by the vortex suppressor 40. Unlike prior art methods for breaking up vortex formation (such as floating logs on the surface of the water), the vortex suppressor of the present invention encourages laminar flow of water toward the turbine. The submergence of the plates may be selectively varied to account for a greater tendency of vortex formation in areas of higher water velocity. By encouraging laminar flow, the plate members block rotational flow which tends toward vortex formation without increasing frictional flow and a resulting head loss.

From the foregoing detailed description of the invention, it has been shown how the objects of the invention have been obtained in a preferred manner. However, modifications and equivalents of the disclosed concepts, such as readily occurred to those skilled in the art, are intended to be included within the scope of this invention.

The embodiments of the invention in which an exclusive property or privilege is claimed are defined as follows:

1. A low head hydraulic turbine installation comprising:
    a foundation structure separating an upper elevation headwater having an upper water surface from a low elevation surface tailwater;
    said foundation having a back wall, a pair of laterally spaced vertical side walls projecting upwardly of said headwater upper surface and a generally level floor defining an open flume for containing a level of water in water flow communication with said headwater;
    gate means for selectively blocking water flow from said headwater into said flume;
    a water passageway formed through said structure connecting said flume in water flow communication with said tailwater;
    said passageway having an outlet submerged within said tailwater and an inlet submerged within said flume;
    a turbine runner supported within said inlet and rotatable about an axis of rotation generally coaxial with a cylindrical axis of said inlet; a generator;
    a rotary shaft connecting said generator and said runner;
    a plurality of plate members;
    means mounting said plate members above said level of water contained in said flume adjacent said back wall with said plate members maintained in fixed space relation generally parallel to said cylindrical axis and with a lower portion of each plate projecting downwardly through said headwater upper water surface and into said headwater within said flume.

2. A low head hydraulic turbine installation according to claim 1 comprising support beams spanning a downstream portion of said side walls; said plate members rigidly secured to a bottom of said support beams in spaced parallel relation.

* * * * *